Feb. 7, 1939.　　　　H. J. DOOLAN　　　　2,146,468
DIRECTION INDICATING DEVICE FOR MOTOR VEHICLES
Filed Nov. 9, 1932
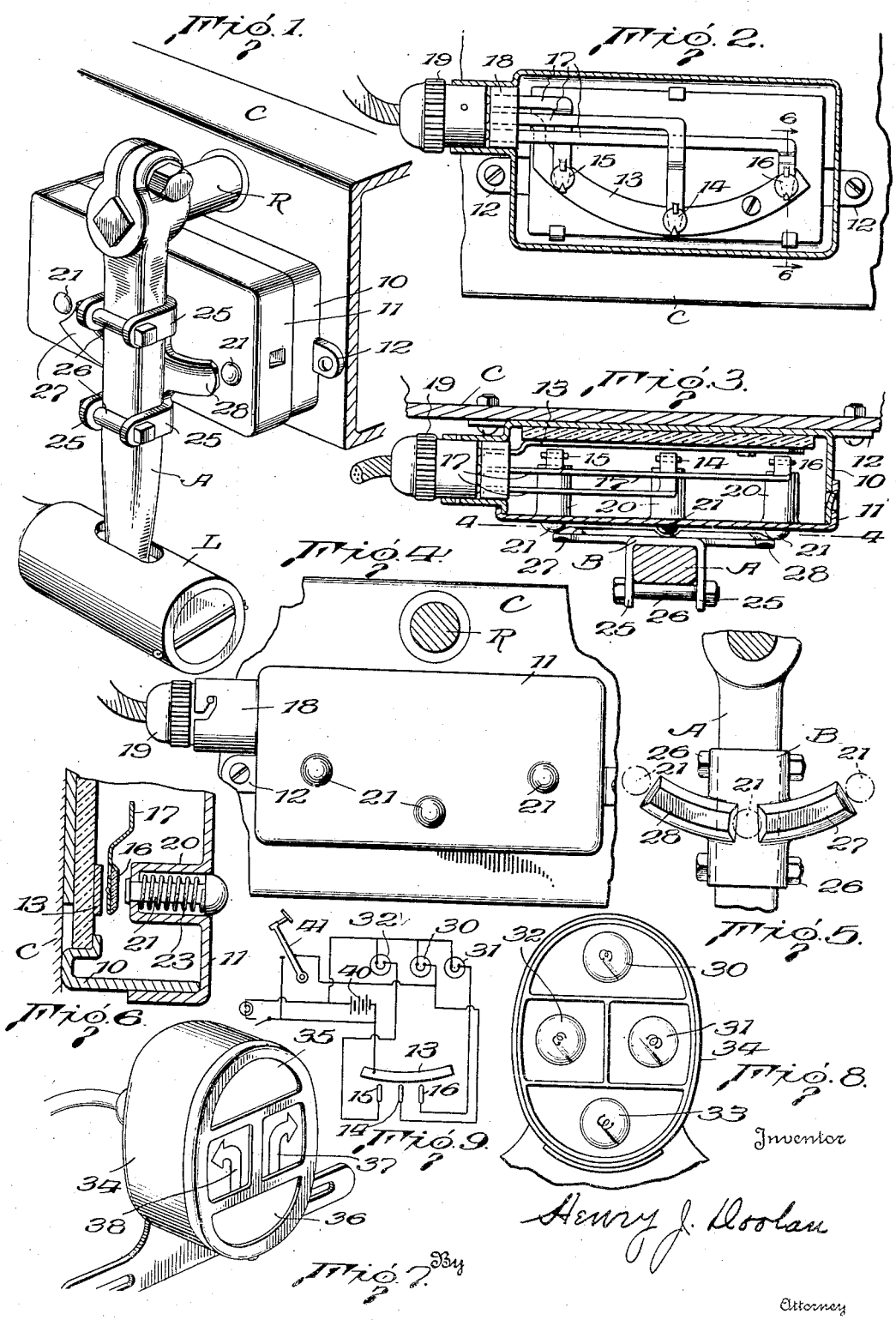
Inventor
Henry J. Doolan
By
Attorney Patented Feb. 7, 1939

2,146,468

UNITED STATES PATENT OFFICE 2,146,468

DIRECTION INDICATING DEVICE FOR MOTOR VEHICLES

Henry J. Doolan, Washington, D. C.; Bessie C. Doolan, administratrix of said Henry J. Doolan, deceased Application November 9, 1932, Serial No. 641,893

7 Claims. (Cl. 200—59)

This invention is a signal device for indicating a contemplated change in direction of travel of a moving vehicle, said indication being in the nature of a warning to drivers of other vehicles which may be travelling behind the first mentioned vehicle.

One of the objects of the invention is to provide a signal device capable of attachment to any standard type of motor vehicle now in use, and so constructed and arranged as to automatically signal to the drivers of following vehicles, any change in direction of the travel of the vehicle equipped with the said signal device. A further object is to provide a signal device of the character mentioned having means for displaying an advance caution signal in the nature of a preliminary warning of a change of direction of the vehicle equipped with the device, so that the drivers of other vehicles will be placed on notice as to a prospective change of direction of the first mentioned vehicle. A further object is to provide a change direction signal device for motor vehicles designed to be operated by a moving part of the steering mechanism of the vehicle, and which will be of simple and inexpensive construction, and so protected that it is not liable to be injured or to readily get out of order or become deranged.

The invention will be hereinafter fully set forth and particularly pointed out in the claims.

In the accompanying drawing:

Figure 1 is a perspective view illustrating a portion of the steering mechanism of an automobile with the invention applied thereto. Figure 2 is a vertical sectional view showing the circuit closing elements. Figure 3 is a horizontal sectional view illustrating the normal open circuit positions of the contact members and the control member. Figure 4 is a front elevation with the control member removed, parts being shown in section. Figure 5 is a front elevation illustrating the control member. Figure 6 is an enlarged detail sectional view illustrating one of the circuit controlling contacts. Figure 7 is a perspective view illustrating the casing in which the signal lamps are carried. Figure 8 is a rear view of said casing with the cover removed. Figure 9 is a diagrammatic view illustrating the electric circuits.

Referring to the drawing, C designates a part of the chassis of a standard type automobile, which may be any part conveniently located with respect to the steering mechanism. R conventionally illustrates a member, which may be part of the worm gear or any other similarly movable part of any standard type motor vehicle steering mechanism. Fixed to said shaft R, and depending therefrom is an operating arm A, which is movably connected with the link L, by means of which the movements of the ordinary steering mechanism are transmitted to the wheels, not shown. The parts thus far mentioned may be of any standard construction and are shown more or less conventionally for illustrative purposes only, and without intent to limit the invention thereto.

Secured to the chassis C in suitable manner is a casing 10 provided with a cover 11. For purposes of illustration, the casing is shown as secured to the chassis frame C by means of ears 12 and suitable screws. Located in the back of the casing 10 is a stationary contact member 13 preferably in the form of an arcuate flat strip of metal. Mounted so as to depend before the contact 13 are a plurality of movable contact members 14, 15 and 16, the contact 14 being located intermediate between the other contacts, at the lowest position with respect to contact 13. Said contact members 14, 15 and 16 as well as the contact member 13 are provided with leads 17 terminating in a socket 18, which may be connected with a suitable source of current by means of a conventionally shown plug 19, containing the necessary number of contacts.

The cover 11 is provided with a plurality of horizontal bosses 20, in each of which is located a plunger 21 having a rounded head. The plungers correspond in number with the contacts 14, 15 and 16, there being one plunger for each of said contacts, the rear ends of the plunger extending through their respective bosses, so as to be in positions to engage their respective contacts. The plungers are maintained in a predetermined position by means of springs 23, and their outward movement is limited in suitable manner, as by flanges. Inward movement of the plungers is limited by contact 13.

B designates a control member designed to be connected with any desired movable part of the steering mechanism. By steering mechanism is meant any element of the combination of elements between and including the hand wheel operated by the driver and those supporting wheels of the vehicle which effect the direction-change movements of the vehicle. For purposes of illustration, the same is shown as secured to an arm or member A, connected to and movable with the shaft R. As shown in Figures 1 and 5, the member B is provided with yokes 25, which are secured to the member A by means of bolts

26. Said control member is provided with two operating arms 27, 28 which are arranged end to end in arcuate form, with a space between their adjacent ends. It will be observed that the arms 27 and 28 are so positioned as to conform to the arcuate contact 13, the arc being on a radius from the center of shaft R, so that the contact 13 and arms 27 and 28, are concentric with said shaft. Also that the ends of the arms are slightly beveled so as to engage the plungers 21 to force them backwardly into engagement with their respective movable contacts, and to force the said movable contacts backwardly into engagement with the fixed contact 13. The members 27 and 28 are of such length that in the normal open circuit positions of the parts, i. e., with the steering mechanism set to drive straight ahead, the plungers 21 are all out of engagement with their respective contacts.

The contact 14 controls the circuit of a caution lamp 30, and the contacts 15 and 16 control circuits to lamps 31 and 32 indicating opposite directions of turning of the vehicle. The lamp 33 is the ordinary tail light lamp which forms no part of the invention. By reference to Figure 7, it will be noted that the top of the lamp casing 34 is provided with an opening 35 for displaying the caution signal 30, an opening 36 for the tail light 33 and openings 37 and 38 containing indicia indicating the direction of turn to be signalled by the lamps 31 and 32.

Referring more particularly to Figure 9, the contact member 13 is connected to one side of the battery 40 and the three contact members 14, 15 and 16 are connected with the respective lamps 30, 31 and 32 so that upon the engagement of either of the contacts 14, 15 and 16 with the contact 13 the proper lamp is flashed. It will also be noted that the brake 41 is connected with the caution light 30, so that said light 30 performs the double function of giving a caution indication while braking, and a similar indication in connection with the turning of the vehicle.

In practice, with the parts in their normal positions, as illustrated in the drawing, assuming the vehicle to be travelling in a forward direction, any movement of the steering mechanism which imparts movement to the arm A will obviously impart corresponding movement to the control member B. Assuming that the turn is to be to the right the inner end of the arm 27 of the control member will first engage the plunger 21 opposite the contact 14 and close the circuit through contact 13 so as to illuminate the caution lamp 30. As the turning movement of the steering mechanism is continued the outer end of arm 28 will engage the plunger opposite contact 16, so as to force said plunger backwardly and close the circuit to the lamp 31. Thus two circuits, i. e., the caution-signal-circuit and a turning-signal-circuit are closed during the turning movement and after being closed are maintained in closed condition until the turn is completed and movement of the control member toward its normal position has been initiated. Obviously the reverse takes place if the direction of turn is reversed. It will be noted in this connection that the proportions of the contacts 27 and 28, and the distance by which they are separated may be varied, as desired, to increase or diminish the periods of signalling between the advance notice of the turn, and the final notice. It will also be clearly understood that the control member B is so connected with the steering mechanism of the vehicle as to automatically move in correlation with all direction-change movements of the steering wheels of the vehicle, so that the operation of the warning signal 30 and either of the other signals 31, 32 is absolutely automatic and in a controlled sequence.

The advantages of the invention will be readily understood by those skilled in the art to which it belongs. For instance, it is well known that although many devices of this type have heretofore been designed, they have not been commercially successful because they rely upon the human element, which is more or less uncertain. Attempts have also been made to provide automatic devices of this type but they have not been commercially successful because they do not provide for the initial or caution advance notice of the intention to turn. By the construction herein described and claimed, the human element is practically eliminated, and an advance notice of an intention to turn is indicated first by the caution signal a substantial period ahead of the turn, and then the final notice is subsequently given by the flashing of the signal indicating the actual change of direction, and before breaking the circuit to the caution signal. An important advantage is that the device is exceedingly simple in construction and is capable of being applied to standard type motor vehicles without necessitating changing of any of the parts thereof. It will also be observed that the contacts are all protected within a casing so that their functions will not be impaired by dirt stirred up during the travel of the vehicle and they will not be exposed to injury by contact with extraneous elements.

Having thus explained the nature of the invention and described an operative manner of constructing and using the same, although without attempting to set forth all of the forms in which it may be made, or all of the forms of its use, what is claimed is:

1. In a signal of the character described, means for controlling a caution-signal circuit, said means consisting of a complemental movable contact, means for controlling separate direction-signal circuits, said last-mentioned means including said arcuate contact and a pair of complemental movably supported contacts, a plurality of independent reciprocably mounted operating members, one for each of said movable contacts, a control member movable independently of said movable contacts and said operating members, and having laterally extended arms positioned parallel with the arcuate contact and having an intermediate open space, said movable contacts and their operating members being so supported and positioned with respect to each other and with respect to said arms that movement of the control member in either direction from a neutral position will first actuate the caution-indicating contact and then actuate one of the direction-indicating contacts, and means for actuating the control member in correlation with all direction change movements of a motor vehicle while the latter is travelling forwardly or backwardly.

2. In a signal of the character described, means for controlling a caution-signal circuit, said means consisting of a normally stationary arcuate contact and a complemental movably supported contact, means for controlling separate direction-signal circuits, said last-mentioned means including said arcuate contact and a plurality of additional complemental movably supported contacts, the movable contact for the caution-signal circuit being located between the other movable contacts, a plurality of spring-pressed plungers for operating the movable contacts, said plungers being independently mounted and positioned opposite to the respective movable contacts, a movably supported control member capable of movement independently of said movable contacts and of said plungers, and having laterally disposed portions for actuating said plungers in opposition to the spring pressure applied thereto, said laterally disposed portions being arranged in arcuate relation parallel with the stationary contact and separated by an intermediate open space between them, said movable contacts and said plungers being so positioned with respect to each other and with respect to said laterally disposed portions that movement of the control member in either direction from a neutral position will first actuate the caution-indicating contact and then actuate one of the direction-indicating contacts, and means for actuating the control member in correlation with all direction change movements of a motor vehicle while the latter is travelling forwardly or backwardly.

3. In a signal of the character described, means for controlling a caution-signal circuit, said means consisting of a normally stationary contact and a complemental movably supported contact, means for controlling separate direction-signal circuits, said last-mentioned means including said stationary contact and a pair of additional complemental movably supported contacts, the movable contact for the caution-signal circuit being interposed between the other movable contacts, said movable contacts being parallel with said stationary contact, a control member movable independently of said contacts and having transversely arranged surfaces for actuating said movable contacts, said transverse surfaces being separated by an intermediate space which normally lies opposite the movable contact of the caution-signal circuit while the parts are in neutral position, said movable contacts being so supported and positioned with respect to each other and with respect to said transversely arranged surfaces that movement of the control member in either direction from a neutral position will first actuate the caution-indicating contact and then actuate one of the direction-indicating contacts, and means for operating the control member.

4. In a signal of the character described, means for controlling a caution-signal circuit, said means consisting of a normally stationary contact and a complemental movably supported contact, means for controlling separate direction-signal circuits, said means including said stationary contact and a pair of additional complemental movably supported contacts, the movably supported caution-signal contact being interposed between the other contacts, a control member movable independently of said movable contacts and having transversely arranged surfaces for operating said movable contacts, said surfaces being separated by an intermediate space which normally lies opposite to the movable contact of the caution-signal circuit while the parts are in neutral position, said movable contacts being so supported and positioned with respect to each other and with respect to the control member that movement of said control member in either direction from a neutral position will cause one of said transverse surfaces to actuate the caution-indicating contact and then cause the other transversely arranged surface to actuate one of the direction-indicating contacts, and means for actuating said control member.

5. In a signal of the character described, a casing, means within the casing for controlling a caution-signal circuit, said means consisting of a normally stationary contact and a complemental movably supported contact, means also within the casing for controlling separate direction-signal circuits, said last-mentioned means including said stationary contact and a pair of additional complemental movably supported contacts, the last-mentioned contacts being equally spaced on either side of the first-mentioned movable contact, a cover for said casing, contact operating means carried by said cover, a movably supported control member capable of movement independently of said movable contacts and located exteriorly of said casing and having transversely disposed surfaces for engaging the contact operating means, said transversely disposed surfaces being separated by an intervening space which normally lies opposite to the movable caution-signal contact while the parts are in neutral positions, said transversely disposed surfaces being so positioned with respect to the movable contacts that movement of the control member in either direction from a neutral position will first actuate the caution-indicating contact and then actuate one of the direction-indicating contacts, and means for actuating the control member.

6. The combination with the steering mechanism of a motor vehicle, including a rotatable member, an arm extended from said member, and a drive link connected with said arm and with the steering wheels in such manner that the rotatable member will automatically move in correlation with all direction change movements of said steering wheels, of a casing, means within said casing for controlling a caution-signal circuit, said means consisting of a normally stationary arcuate contact and a complemental movably supported contact, said arcuate contact being concentric with said rotatable member, means also within said casing for controlling separate direction-signal circuits, said last-mentioned means including said fixed arcuate contact and a pair of additional complemental movably mounted contacts, said last-mentioned movably mounted contacts being equally spaced on opposite sides of the first-mentioned movable contact, plungers mounted in said casing in position to independently engage and move the respective movable contacts, springs normally acting to project the plungers out of engagement with the movable contact, and a control member connected with said radial arm and movable independently of the movable contacts and of said plungers, said control member having transversely disposed surfaces also arranged in arcuate relation concentric with the axis of said rotatable member, said transverse surfaces being separated by an intermediate space which normally lies opposite to the movable contact or the caution-signal circuit while the parts are in neutral position, said movable contacts and said plungers being so supported and positioned with respect to each other and with respect to said transversely disposed surfaces that movement of said control member in either direction from a neutral position will first actuate the caution-indicating contact and then actuate one of the direction-indicating contacts.

7. In an automobile signalling device, a caution-signal circuit, two turn-indicating circuits, means for controlling the caution-signal circuit, said means consisting of a normally stationary contact and a complemental movably supported contact, means for controlling the separate turn-indicating circuits, said last-mentioned means including said stationary contact and a pair of additional complemental movably supported contacts, the movable contact for the caution-signal circuit being located intermediately between the other movable contacts, a control member movable independently of said movable contacts and provided with means for moving the respective movable contacts into engagement with the stationary contact, said control member having means normally disengaged from the movable contacts while the parts are in neutral positions, the movable contacts for the turn-indicating circuits and the intermediately positioned movable contact for the caution-signal circuit being so supported and positioned with respect to each other and with respect to the contact actuating means that movement of said control member in either direction from said neutral position will first actuate the caution-indicating contact and then actuate one of the direction-indicating contacts, and means for actuating the control member in correlation with all direction change movements of a motor vehicle.

HENRY J. DOOLAN.